(12) United States Patent
Sheldon et al.

(10) Patent No.: US 7,409,645 B2
(45) Date of Patent: *Aug. 5, 2008

(54) USER INTERFACE AND OPERATING SYSTEM FOR PRESENTING THE CONTENTS OF A CONTENT COLLECTION BASED ON CONTENT TYPE

(75) Inventors: Michael G. Sheldon, Seattle, WA (US); Todd Ouzts, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

This patent is subject to a terminal disclaimer.

(21) Appl. No.: 11/075,986

(22) Filed: Mar. 9, 2005

(65) Prior Publication Data

US 2005/0154754 A1 Jul. 14, 2005

Related U.S. Application Data

(62) Division of application No. 10/147,541, filed on May 16, 2002, now Pat. No. 7,171,626.

(60) Provisional application No. 60/351,284, filed on Oct. 29, 2001.

(51) Int. Cl.
*G09F 7/00* (2006.01)
(52) U.S. Cl. .................. 715/810; 715/853; 707/200
(58) Field of Classification Search .......... 715/825, 715/853, 517, 526; 709/224
See application file for complete search history.

(56) References Cited

U.S. PATENT DOCUMENTS

| | | | | |
|---|---|---|---|---|
| 5,572,648 A * | 11/1996 | Bibayan | ............ | 715/825 |
| 5,652,876 A * | 7/1997 | Ashe et al. | ............ | 703/26 |
| 6,434,552 B1 * | 8/2002 | Leong | ............ | 707/4 |
| 6,522,268 B2 * | 2/2003 | Belu | ............ | 341/51 |
| 6,613,101 B2 * | 9/2003 | Mander et al. | ............ | 715/526 |
| 7,171,626 B2 * | 1/2007 | Sheldon et al. | ............ | 715/526 |
| 2001/0028363 A1 * | 10/2001 | Nomoto et al. | ............ | 345/748 |
| 2002/0033848 A1 * | 3/2002 | Sciammarella et al. | ............ | 345/838 |

* cited by examiner

*Primary Examiner*—Weilun Lo
*Assistant Examiner*—Sara M Hanne
(74) *Attorney, Agent, or Firm*—Shook, Hardy & Bacon, LLP

(57) ABSTRACT

An apparatus and method for execution in a graphical user interface environment are provided. The apparatus and method are used to display a set of items within a content collection, such as a set of files within a folder on a computer operating system. The method includes obtaining data from the items that describes an item type for a number of the items. Based upon the obtained item types a distribution of the types of items within the collection is determined. The content collection is categorized based upon the determined distribution and, based upon the category, the content collection is displayed in a certain format that is chosen to best display that category of content. A user interface is also provided that includes a working area that displays the contents of a content collection. In the working area, the format of the display varies based upon the type of contents in the content collection. The user interface also includes a menu adjacent the working area that displays tasks corresponding to the contents exhibited in the working area.

13 Claims, 7 Drawing Sheets

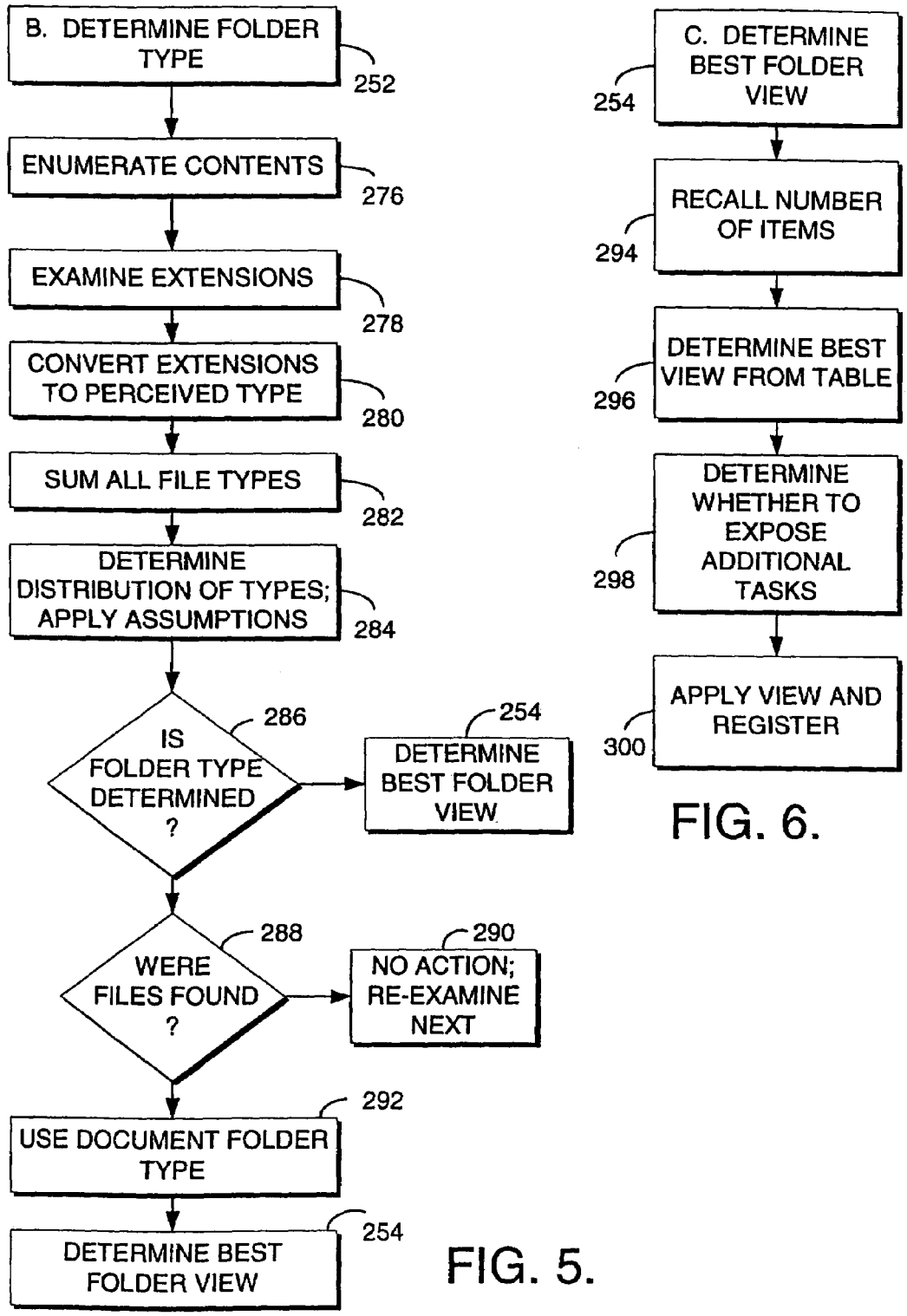

USER INTERFACE AND OPERATING SYSTEM FOR PRESENTING THE CONTENTS OF A CONTENT COLLECTION BASED ON CONTENT TYPE

CROSS-REFERENCE TO RELATED APPLICATION

This application is a divisional of U.S. application Ser. No. 10/147,541 filed May 16, 2002, issued as U.S. Pat. No. 7,171, 626 on Jan. 3, 2007, entitled SYSTEM AND METHOD FOR PRESENTING THE CONTENTS OF A CONTENT COLLECTION BASED ON CONTENT TYPE, which claims the benefit of U.S. Provisional Application No. 60/351,284, filed Oct. 29, 2001.

STATEMENT REGARDING FEDERALLY SPONSORED RESEARCH OR DEVELOPMENT

None

TECHNICAL FIELD

In general, the present invention relates to computer software, and more particularly, to a method and system for automatically determining the content type of a content collection, such as a folder, and presenting the contents in a view based upon the particular content type.

BACKGROUND OF THE INVENTION

Computer systems are becoming increasingly complex and now have the ability to recognize and process a variety of content types. For example, computer users may now utilize the computer to store and manipulate video, image, audio and text files. As the variety of content types has increased, the computer user is challenged to organize the files in such a way so as to allow the files to be readily located and accessed. Many computers are now utilizing operating systems having graphical user interfaces. On such computers, depending upon the content type, one particular view of the contents may be more readily usable than another view. The computer user may have the opportunity to manually change from one view to another, until the desired view is obtained. However, the computer user may not be aware of the different view options available within the operating system.

As a matter of very general background, a file is any collection of related information stored on a computer system and given a name so that it can be retrieved when needed. The type of information contained within the file can vary greatly. The file can be a computer program, a document, a piece of music, a video clip, as well as any of a number of different things. In most major operating systems, the files are organized within collections called folders. A folder is basically another type of file, i.e. one that contains a list of other files.

When the computer user opens a folder, the operating system may display the files contained within the folder. As stated above, one particular view of the files may be more readily usable than another view. The present invention assists the computer user by presenting the user with a view based upon the type of files and the number of files that the folder contains.

BRIEF SUMMARY OF THE INVENTION

The present invention is directed to a method and apparatus for execution in a graphical user interface environment. The apparatus and method are used to display a set of items within a content collection, such as a set of files within a folder on a computer operating system. The method includes obtaining data from the items that describes an item type for a number of the items. For example, the item type may be an image file, or a video file. Based upon the obtained item types a distribution of the types of items within the collection is determined. The resulting distribution can be used to determine a category for the content collection. For example, if the distribution reveals that the distribution is weighted to include a majority of image files, then the content category is one for pictures. Based upon the content category, the content collection is displayed in a certain format that is chosen to best display that category of content.

A user interface is also provided that includes a working area that displays the contents of a content collection. In the working area, the format of the display varies based upon the type of contents in the content collection. The user interface also includes a menu adjacent the working area that displays tasks corresponding to the contents exhibited in the working area.

Additional advantages and novel features of the invention will be set forth in the description which follows, and in part will become apparent to those skilled in the art upon examination of the following, or may be learned from practice of the invention.

BRIEF DESCRIPTION OF THE SEVERAL VIEWS OF THE DRAWINGS

The present invention is described in detail below with reference to the attached drawing figures, wherein:

FIG. 5 is a flow chart illustrating a more-detailed flow of one aspect of the present invention;

FIG. 6. is a flow chart illustrating a more-detailed flow of one aspect of the present invention;

DETAILED DESCRIPTION OF THE INVENTION

The present invention provides a method and user interface for use in a graphical user interface environment. The invention is used to "sniff" the contents of a content collection, such as a set of files within a folder on a computer operating system. This "sniffing" provides data that describes an item type for a number of the files. For example, the item type may be an image file, or a video file. This information is provided by the file extension of the files, and by mapping that file extension to a file type. Based upon the obtained item types, a folder type is determined based upon the weighting of the types of items within the folder. The resulting folder type is used to determine the best format for the display of the files within the folder. Therefore, in the provided user interface a working area is presented that displays the contents or files of the folder. In the working area, the format of the display varies based upon the folder type. The user interface also includes a menu adjacent the working area that displays tasks corresponding to the contents exhibited in the working area.

Having briefly described an embodiment of the present invention, an exemplary operating environment for the present invention is described below.

Exemplary Operating Environment

Figure 1:
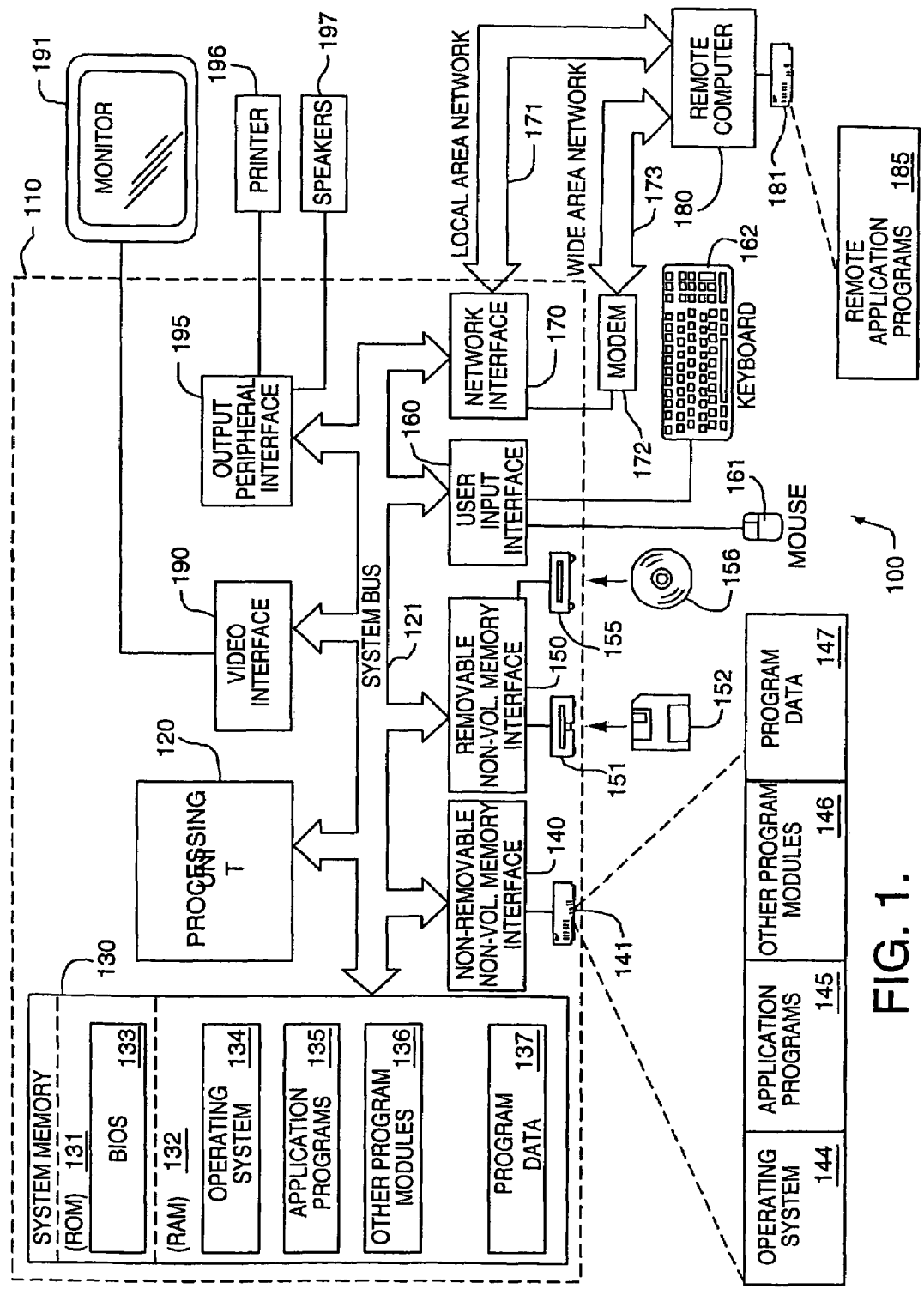
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

System for Determining and Displaying Content

The system and method of the present invention, which involves the determination of content in a content collection and the display of that content, will be explained below. Prior to that discussion, some additional material is provided to assist in the explanation.

Figure 2:
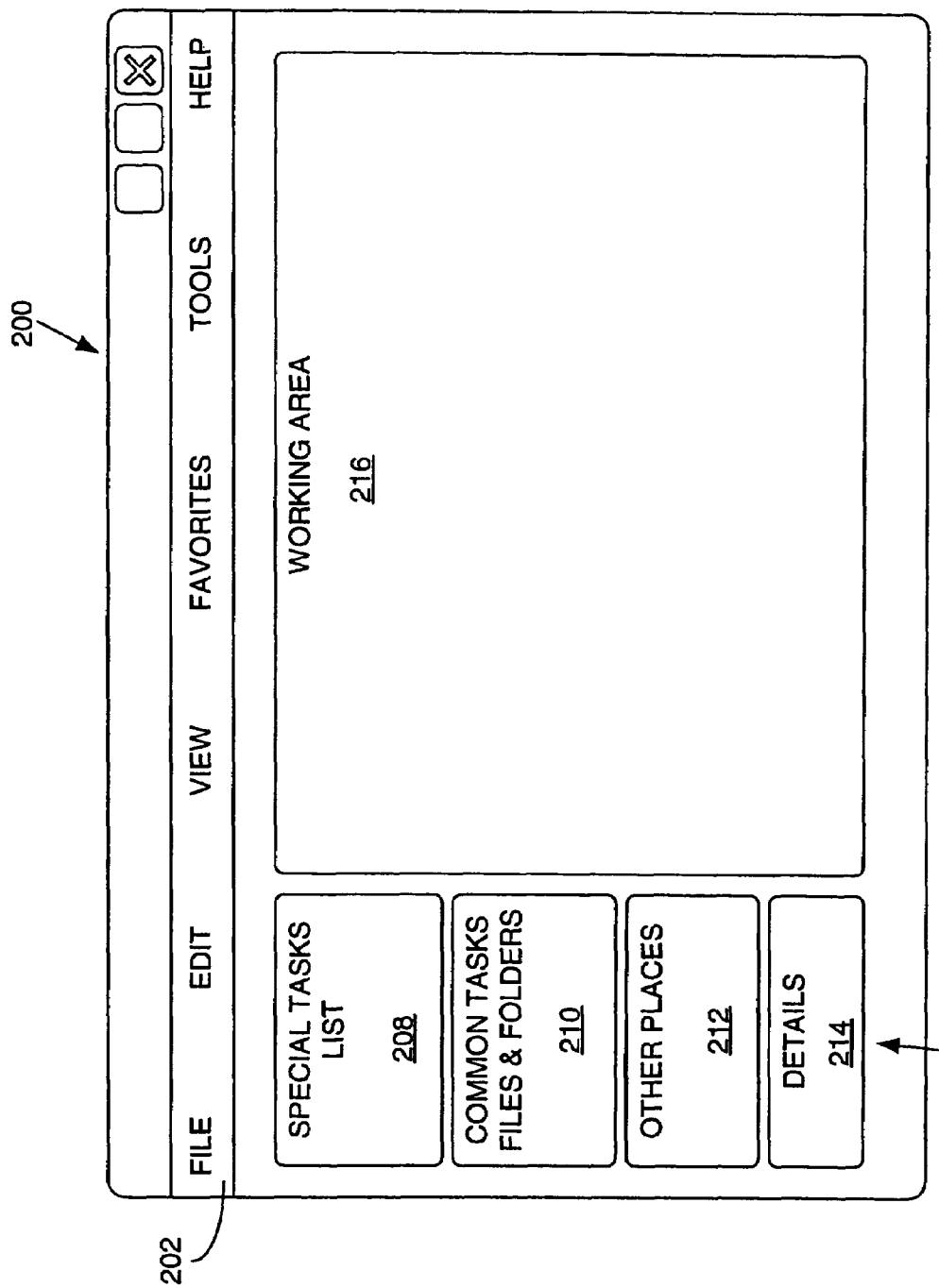
FIG. 2 is a schematic view of a window layout usable with an open folder in accordance with the present invention.

As best seen in FIG. 2, a display is shown illustrating a rectangular window 200 suitable for use with the present invention in a graphical operating environment, such as the WINDOWS family of operating systems from the Microsoft Corporation of Redmond, Wash. The window 200 is one that may be displayed when a content collection, such as a folder, is opened. Other displays are, of course, within the scope of the present invention and the illustrated window 200 is presented only for context. The window 200 is typically equipped with a menu bar 202 which can be used to issue commands to the operating system by clicking various buttons or making selections from drop-down menus. Additionally, the window 200 can be displayed with a task pane 204. Task pane 204 includes different areas, such as a special tasks area 208, a common tasks for files and folders area 210, an other places area 212 and a details area 214. The task areas 208 and 210 present to the user different tasks that may commonly be performed on files contained within the folder associated with window 200. The other places area 212 is a list of other folders that the user may desire to navigate to quickly. Finally, the details area 214 can be used to show the user particular properties of selected objects. Window 200 also presents a working area 216. Working area 216 displays icons or other indicia corresponding to all the files and folders contained within the open folder associated with window 200.

Figure 7:
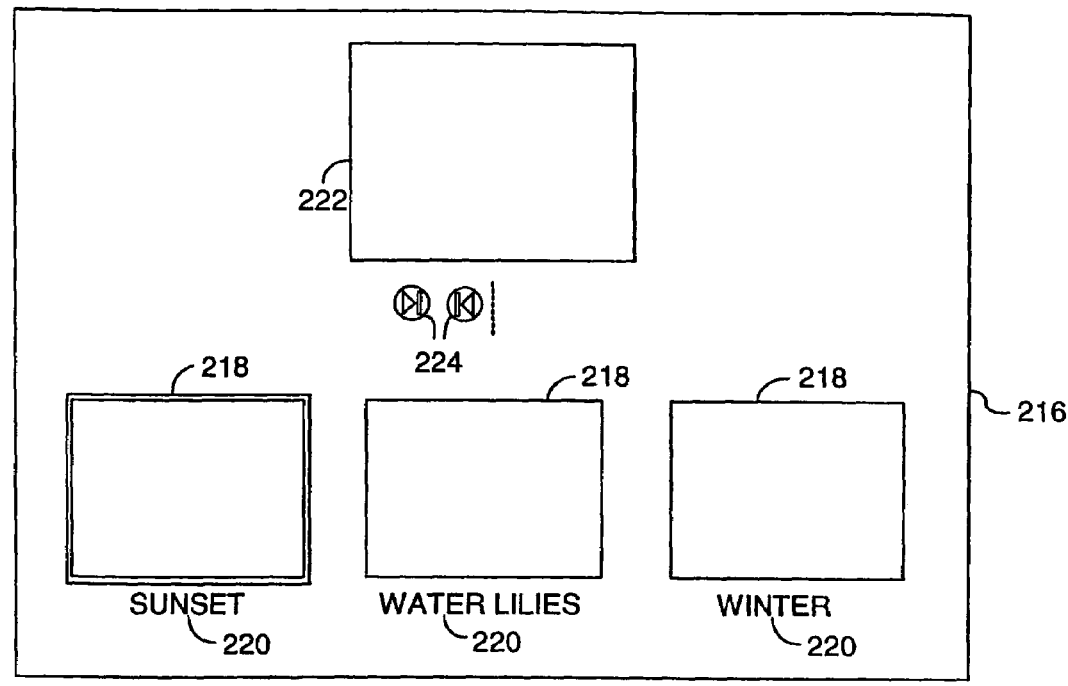
FIG. 7 is a schematic view of a window demonstrating one possible view of the working area.

As noted above, the view presented within working area 216 can vary and the best view for one type of information may not be the best view for another type of information. By way of example, a number of different views are presented schematically for working area 216 in FIGS. 7-12. Beginning with FIG. 7, a view is shown that is available in the MICROSOFT WINDOWS XP operating software, and is known as the filmstrip view. In the filmstrip view, the files in the folder are arranged as if the files were in a filmstrip. As shown in FIG. 7, a series of thumbnail images 218 of the folder's files appear in a linear order in one portion of the window. Each image 218 may also have a textual filename description 220 associated with the image. A selected image 222 is also displayed in a larger size above the images 218. While not shown in FIG. 7, the images 218 and 222 are actual preview images of the files they represent. A pair of buttons 224 is displayed below image 222 that can be used to navigate forward and backward through the images 218. Other buttons, not shown, may be provided to manipulate the selected image 222, such as to reorient the picture between a landscape and portrait orientation. The filmstrip view is one that is particularly suited for viewing a folder of pictures.

Figure 8:
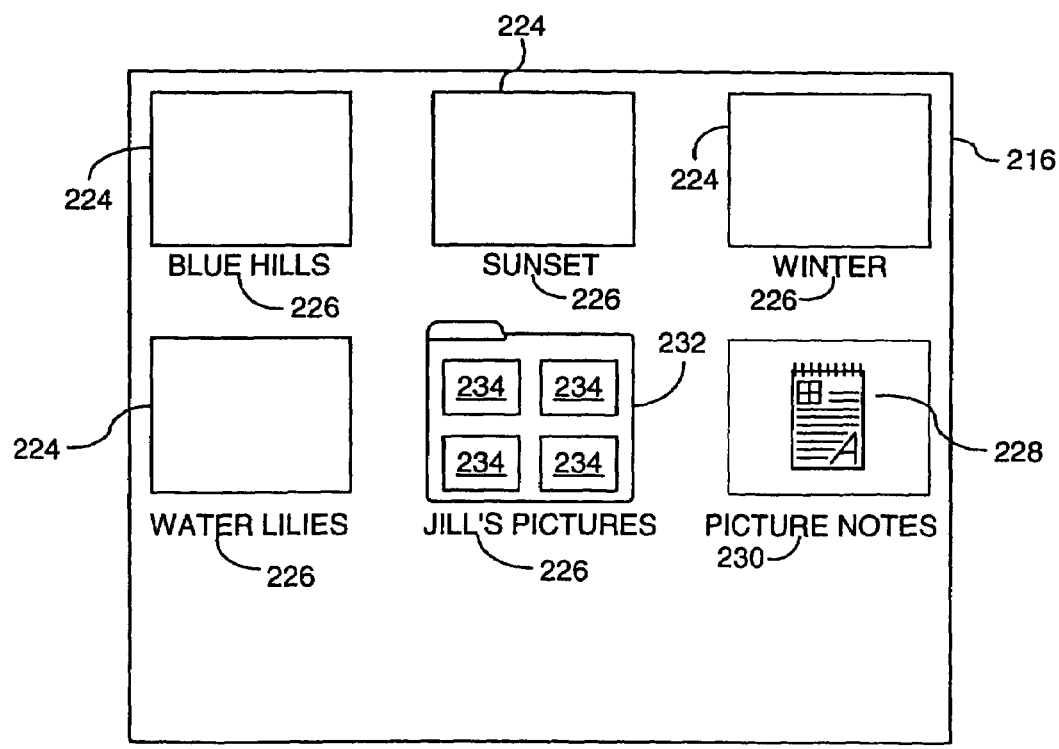
FIG. 8 is a schematic view of a window demonstrating another possible view of the working area.

Turning now to FIG. 8, another view is shown that is known as the thumbnails view. The thumbnails view displays the contents of the folder as miniature images 224. Each image 224 may also have a textual filename description 226 associated with the image. If a miniature version of a file cannot be shown, an icon is displayed to indicate the type of file. For example, an icon 228 may be displayed indicating a document, along with a textual filename description 230. Additionally, in the thumbnails view, a folder 232 within the open folder is displayed with some selected number of smaller images 234 contained within the folder 232. The thumbnails view is also one which is suited for viewing a folder of pictures. Like FIG. 7, the images 224 and 234 are not shown in FIG. 8 but in practice are actual images of the files they represent.

Figure 9:
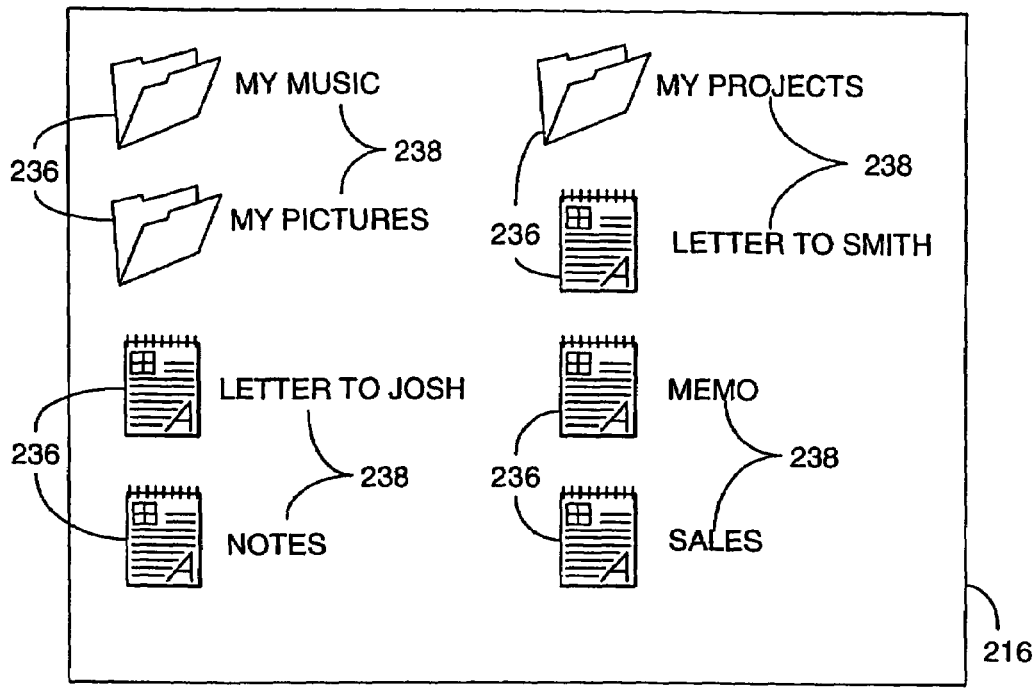
FIG. 9 is a schematic view of a window demonstrating another possible view of the working area.

FIG. 9 illustrates another view known as the tiles view. In the tiles view, the contents of the folder are displayed as large icons 236. A textual filename 238 associated with each icon 236 is also displayed, along with some information such as the type or size of the file. In FIG. 9, the additional information is not shown.

Figure 10:
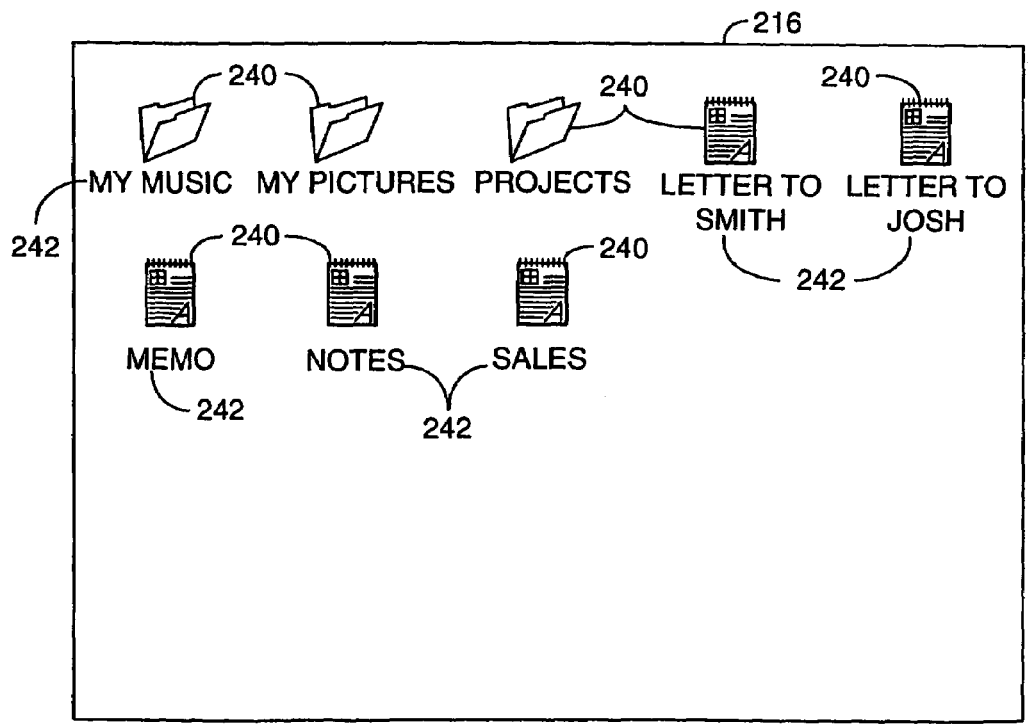
FIG. 10 is a schematic view of a window demonstrating another possible view of the working area.

Turning to FIG. 10, a view known as the icons view is shown. In the icons view, the contents of the folder are displayed as smaller icons 240. The filename 242 associated with each icon 240 is displayed below each icon. The icons view is a more compact view than the tiles view, but will display less information.

Figures 11, 12:
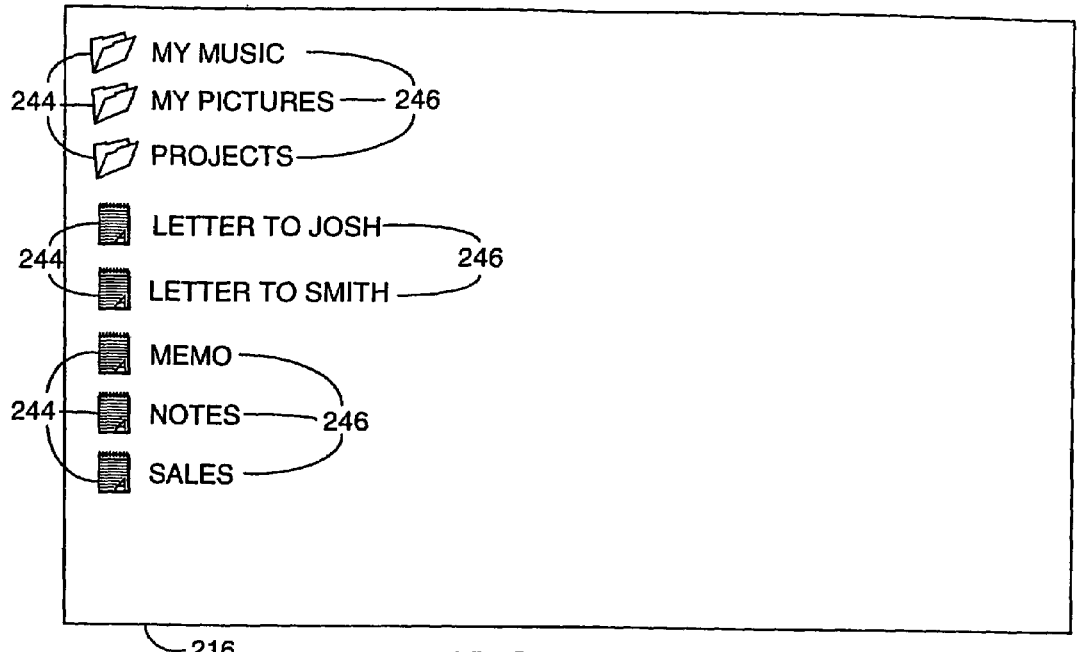
FIG. 11 is a schematic view of a window demonstrating another possible view of the working area.
FIG. 12 is a schematic view of a window demonstrating another possible view of the working area.

FIG. 11 illustrates a view known as the list view. In the list view, the items within the folder are displayed as small icons 244 and corresponding filenames 246. The list view therefore displays more limited information than some other views, but can display a larger quantity of information.

Finally, FIG. 12 illustrates the details view. In the details view, the items are again displayed as small icons 244 and corresponding filenames 246, much like the list view. However, in the details view, more information is provided, such as the size of the file 245, the type of file 247 and the date modified 248. Other information could be provided in this view as well.

The views described above in connection with FIGS. 7-12 are in no way intended to be comprehensive of all of the possible views. It should be understood that the views described above are intended to provide context to the particular invention, and not to limit the scope of the invention. As described below, the present invention can be implemented with the above-views, or any number of additional and different views.

Figure 3:
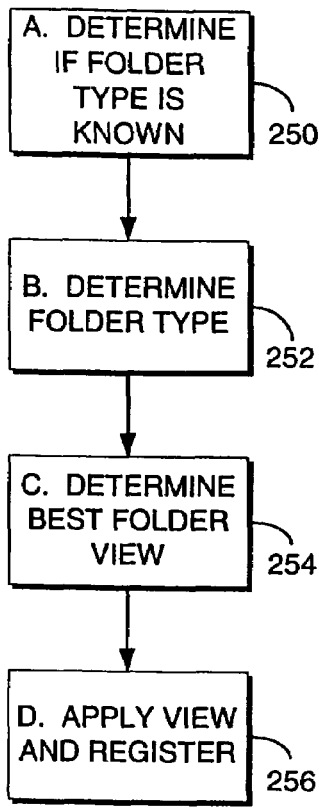
FIG. 3 is a flow chart illustrating certain aspects of the present invention.

The method of implementing the present invention is described with reference to FIGS. 3-6 and with initial reference to FIG. 3. The method is used to determine the contents of a folder, and if a particular folder view has not yet been specified, to utilize the content determination to present to the contents of the folder to the computer user in a view best suited for the contents being displayed. The view presented is based upon the content of the folder and the number of items within the folder. Turning to FIG. 3, the basic steps of the method are shown. The first step 250 is a determination as to whether the folder in question is already of a known type. If the folder type is unknown, the method continues at 252 by determining the folder type. Then, based upon the determined folder type and the number of items within the folder, the best folder view is determined at 254. For example, and as more fully explained below, one of the views as described above with reference to FIGS. 7-12 may be displayed. After the best view is determined, the view is applied and displayed to the computer user at 256. When the view is applied, it is also registered at 256 with the operating system so that the view is persisted until changed.

Figure 4:
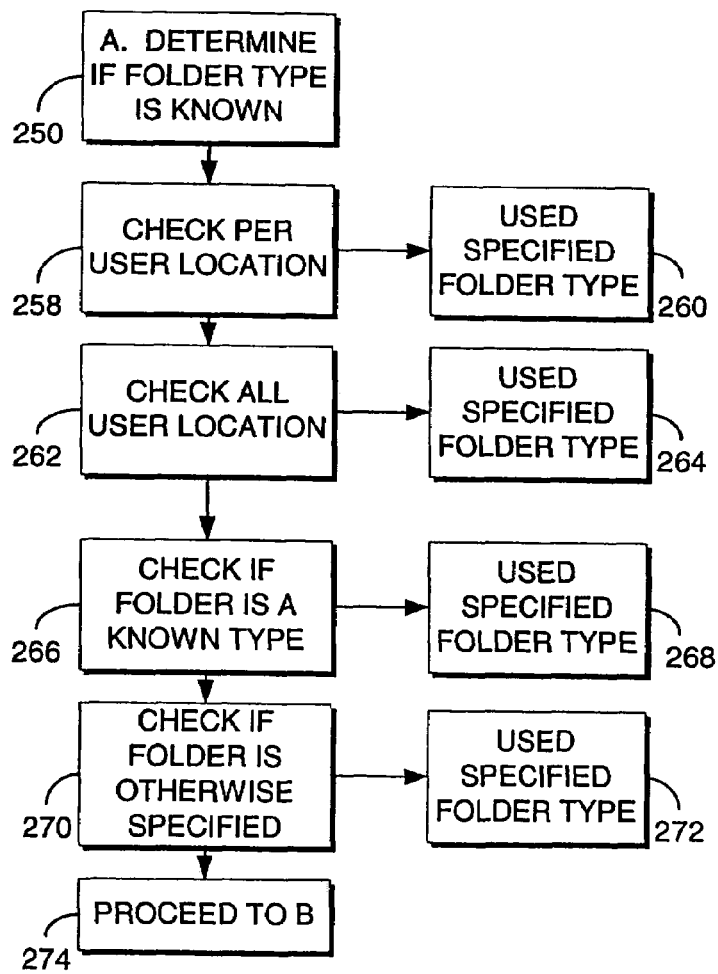
FIG. 4 is a flow chart illustrating a more-detailed flow of one aspect of the present invention.

FIG. 4 presents a more-detailed description of step 250 in the determination as to whether the folder type is already known. The method involves checking whether the computer user has specified a particular folder type at 258. If the user has specified a particular type, that folder type is used as indicated at 260. If the user has not specified a folder type, the process continues at 262 by checking to see if the "alluser" folder location specifies a folder type for the folder. In the WINDOWS operating system, for example, the desktop.ini location may specify a folder type. If the alluser location specifies a folder type for the folder, then that folder type is used as indicated at 264. If the folder type is not specified, then the process continues at 266 by checking the folder to determine if it is a known folder to the operating system. For example, in the WINDOWS operating system, the "My Documents," "My Pictures," and "My Music" folders are known to the operating system. If the folder is known, the folder type associated with the known folder is used as indicated at 268. The process may continue by checking any other locations to determine if the folder type has been specified at 270 and if so, using that specified type at 272. If the above-described process has not resulted in a specified folder type being located, the process continues to step 252 as indicated at step 274.

The process of determining the unknown folder type of step 252 is more fully described with reference to FIG. 5. As shown in FIG. 5, the process begins by enumerating the contents of the folder at 276. The count of the items of step 276 is then recorded in memory for later use. Each file extension is then examined at 278. A period and an extension follow each filename. This extension is usually three to four letters long. The extension denotes the file type and informs the operating system how to treat the file. Each extension is then converted to a perceived file type at 280. For example, a file extension ".wma" is converted to perceived file type of "music" because files having the .wma extension are known to be digital music files. The table below sets forth the known file extensions and the perceived type associated with each extension. It should of course be understood that other and new file extensions may be created and are within the scope of the present invention. In the table, six perceived file types are listed along with a number of known file extensions associated with each type.

282. Based upon this summation, a file type distribution is obtained at 284. At this stage, if one particular perceived file type is more prevalent than the others are, the folder type is set based upon that perceived type. If the audio perceived type is more prevalent, the folder type is assumed to be a "music" folder. If the image perceived type is more prevalent, the folder type is assumed to be a "photoalbum" folder. If the video perceived type is more prevalent, the folder type is assumed to be a "videos" folder. If one of the other perceived types is more prevalent, the folder type is assumed to be a "documents" folder. The assumptions may be applied and adjusted as necessary, but in a preferred embodiment, any particular perceived type should equal at least sixty percent of the distribution before that perceived type is assumed to be "more prevalent" given the description above. In other words, any one perceived type should account for sixty percent of the folder contents before that perceived type is used to determine the folder type.

The process then continues at 286 by determining whether the result of the distribution has resulted in a folder type being determined. If the folder type has been determined, the process continues by deciding on the best folder view at 254 as described more-fully below with reference to FIG. 6. If the folder type has not been determined, the process determines if any files were found in the enumerating step 276, as indicated at 288. If no files were found within the folder, the process records this fact and allows the folder to be reexamined again at a later time, as indicated at 290. This circumstance could exist if the computer user created a new folder, but had not yet populated the folder with any files. At this stage, it would not be beneficial to set any particular folder type, because the use of the folder cannot yet be determined. If, however, files were found, the process assumes the folder to be document folder as shown at 292 and then determines the best folder view as shown by 254. This could be the case, for example, if no one perceived type accounted for the required sixty percent of the distribution.

The process continues once a folder type has been determined by determining the best folder view at 254 as described with reference to FIG. 6. As shown in FIG. 6, the number of

| PERCEIVED FILE TYPE | | | | | |
|---|---|---|---|---|---|
| IMAGE | AUDIO | COMPRESSED | TEXT | VIDEO | SYSTEM |
| .fpx; .mix; bmp; .dib; .rle; .ico; .wmf; .emf; .gif; .png; .jfif; .jpe; .jpeg; .jpg; .tif; .tiff; | .snd; .aif; .aif; .aifc; .aiff; .au; .cda; .mid; .midi; .wav; .wax; .m3u; .mp3; .wma; .rmi | .tar; .TGZ; .GZ; .Z; .zip; .wmz; .wsz; | .c; .cpp; .hpp; .cxx; .hxx; .xml; .xsl; .css; .hta; .htm; .html; .h; .shtml; .plg; .csv; .tsv; .inc; asm; .sql; .pl; .def; .asmx; .php3; .java; | .wvx; .wm; .wmx; .wmv; .mpa; .mpe; .mpeg; .mpg; .mpv2; .asf; .asx; .avi; .IVF; m1v; .mp2; .mp2v; | .vxd; .386; .ocx; .chk; .local; .manifest |

In a preferred embodiment, the file extensions are examined only to a point. In other words, only a certain number of the files are examined so that the process of the invention does not occupy an inordinate amount of operating system resources. In the preferred embodiment, the only the first one hundred file extensions of any folder are examined. Continuing with FIG. 5, after the file extensions have been converted to a perceived file type, the various file types are summed at items within the folder obtained from the enumerating step 276 is recalled at 294. Based upon the folder type and the number of items within the folder, a view is determined at 296 that is thought to be the best view for the type of information and the amount of information. The table below sets forth the view from among those described above with reference to FIGS. 7-12 that is thought best based upon the folder type and the number of items.

| Folder Type | Views <25 | Views 25-41 | Views >50 | Task List |
|---|---|---|---|---|
| Documents | Tile | Tile | Icon | |
| MyDocuments | Tile | Tile | Icon | |
| Pictures | Film-strip | Thumb-nail | Thumbnail | Pictures (task header, list) |
| MyPictures | Film-strip | Thumb-nail | Thumbnail | Pictures |
| PhotoAlbum | Film-strip | Thumb-nail | Thumbnail | Pictures |
| Music | Tile | Tile | Detail | Music |
| MyMusic | Thumb-nail | Tile | List | Music |
| MusicArtist | Thumb-nail | Thumb-nail | Thumbnail | Music |
| MusicAlbum | Tile | Tile | Details | Music |
| Videos | Thumb-nail | Thumb-nail | Thumbnail | Videos |
| MyVideos | Thumb-nail | Thumb-nail | Thumbnail | Videos |
| VideoAlbum | Thumb-nail | Thumb-nail | Thumbnail | Videos |
| UseLegacyHtt | Tile | Tile | Icon | none |
| CommonDocuments | Tile | Tile | Icon | CommonDocuments |

As can be seen, the best view can vary even within a particular folder type as the number of items within the folder varies. For example, if the folder type is determined to be a photoalbum type, the better view is a filmstrip view with less than 25 items, but is a thumbnail view with more than 25 items. Again, the views set forth in the above table are those that are thought to be the best, but the present invention is in no way limited to the views presented for each of the folder types within the ranges given above. If an existing folder type is found from a previous operating system specification (a "legacy" folder), the folder type is set to "uselegacyhtt" and the views are determined as set-forth in the above table.

Once the view is established, the process determines whether to expose additional tasks within the special tasks area 208, as indicated at 298. This decision is made based upon the determined folder type, as shown in the table above. For example, for the pictures, mypictures and photoalbum folder types, a set of additional tasks called "picture tasks" is exposed within special tasks area 208 when the folder is opened. These picture tasks can include shortcuts to commonly used tasks associated with picture files, such as "view as a slide show," "order prints online," or "print pictures." Similarly targeted tasks are associated with the special task sets for videos and music.

After the folder type, best view and any additional special tasks are determined, the information is applied and displayed to the computer user, as indicated at 300. The information is also recorded in the operating system registry so that the process need not be repeated for the folder each time it is opened. By recording the information, the process will know at the beginning step 250 that a folder type is already known and the view will be displayed accordingly.

The present invention therefore provides an enhanced experience for the computer user. The experience for the user is better because items, such as files, within a content collection or folder are presented in a view that is based upon the type of items the folder contains as well as the number of items within the folder. The user can adjust the views if the user should so desire. The user is thus presented with views that are more useful in the first instance and does not require the user to manually change views to obtain a view designed for the content being viewed.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and with the scope of the claims.

What is claimed is:

1. One or more computer-readable storage media having computer-executed instructions embodied thereon for presenting a user interface on a display device, the user interface comprising:
    code for presenting a working area that displays contents of a content collection, a single format of the displayed contents varying based upon a most prevalent type of contents and a number of contents determined to be in the content collection, wherein the single format indicates the most prevalent type of content in the content collection based on a file extension appended to each of the displayed contents; and
    code for presenting a menu adjacent to the working area that displays tasks corresponding to the determined most prevalent type of contents exhibited in the working area.

2. The one or more computer-readable storage media as recited in claim 1, wherein the content collection comprises a folder and wherein the contents comprise files.

3. The one or more computer-readable storage media as recited in claim 2, further comprising code for displaying an image preview comprising presenting a representation of each of the files according to the most prevalent type of files at a user interface.

4. The one or more computer-readable storage media as recited in claim 3, wherein options in the menu change in response to changing the content type of the files.

5. The one or more computer-readable storage media as recited in claim 3, further comprising code for displaying the image preview comprising presenting the representation of each of the files according to the number of files within the folder presented at the user interface.

6. The one or more computer-readable storage media as recited in claim 5, further comprising code for selecting the image preview based whether the number of files within the folder exceeds a predefined threshold.

7. The one or more computer-readable storage media as recited in claim 6, wherein selecting the image preview comprises displaying individual views of the files in the single format if the number of the files is below the predefined threshold, and the displaying the files at the image preview that comprises a viewer if the number of the files exceeds the predefined threshold.

8. A computer-storage media having encoded thereon a graphical user interface to present a first display area and a second display area, the graphical user interface comprising:
    a first display area configured for presenting a working area that displays contents of a content collection, assigning a single format of the displayed contents varying based upon a most prevalent type of contents determined to be in the content collection and based upon a number of contents derived from enumerating the contents of the content collection and for presenting contents of the content collection according to the assigned single format indicating the most prevalent type of content in the content collection based on a file extension appended to each of the displayed contents; and a second display area configured for presenting a menu adjacent to the working area that displays tasks corresponding to the most prevalent determined type of content exhibited in the working area;

wherein the first display area and the second display area are presented to a user at the graphical user interface.

9. The computer-storage media of claim 8, wherein the content collection comprises a folder and wherein the contents comprise files.

10. The computer-storage media of claim 9, wherein the first display area is further configured for displaying an image preview comprising presenting a representation of each of the files according to the most prevalent type of files at the graphical user interface.

11. The computer-storage media of claim 10, wherein options in the menu change in response to changing the content type of the files.

12. The computer-storage media of claim 10, wherein the type of files that comprise an image preview are image files, wherein the most prevalent type of files that comprise an image preview are determined to be image files, the image preview displaying an image-file representation of each of the files, as indicated by the single format.

13. One or more computer-readable storage media having computer-executable instructions embodied thereon for presenting a user interface on a display device, the user interface comprising:

code for presenting a working area that displays contents of a content collection, and for assigning a single format of the displayed contents varying based upon a most prevalent type of contents determined to be in the content collection and based upon a number of contents enumerated within the content collection; and code for presenting a menu adjacent to the working area that displays tasks corresponding to the determined most prevalent type of content exhibited in the working area, code for presenting contents of the content collection according to the single format indicating the most prevalent type of files based on a file extension appended to each of the files, displaying an image preview comprising presenting a representation of each of the files according to the file type at a user interface, and wherein the most prevalent type of files that comprise an image preview are determined to be image files, the image preview displaying an image-file representation of each of the files, as indicated by the single format.

* * * * *